(12) United States Patent
Hemphill et al.

(10) Patent No.: US 10,011,308 B2
(45) Date of Patent: Jul. 3, 2018

(54) TAILGATE ASSEMBLY

(71) Applicant: Ford Global Technologies, LLC, Dearborn, MI (US)

(72) Inventors: Joshua Robert Hemphill, White Lake, MI (US); Jeffrey Hemphill, Tawas, MI (US); Jack Marchlewski, Saline, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 15/359,774

(22) Filed: Nov. 23, 2016

(65) Prior Publication Data

US 2018/0141594 A1    May 24, 2018

(51) Int. Cl.
| | |
|---|---|
| *B60P 3/14* | (2006.01) |
| *B62D 33/02* | (2006.01) |
| *B60P 3/40* | (2006.01) |
| *B62D 33/027* | (2006.01) |
| *B62D 33/03* | (2006.01) |

(52) U.S. Cl.
CPC ............ *B62D 33/0207* (2013.01); *B60P 3/14* (2013.01); *B60P 3/40* (2013.01); *B62D 33/0273* (2013.01); *B62D 33/03* (2013.01)

(58) Field of Classification Search
CPC ............ B62D 33/0207; B62D 33/0273; B62D 33/03; B60P 3/14; B60P 3/40
See application file for complete search history.

(56) References Cited

U.S. PATENT DOCUMENTS

| | | | |
|---|---|---|---|
| 6,149,219 A | 11/2000 | Schambre et al. | |
| 6,158,798 A | 12/2000 | Stedtfeld et al. | |
| 6,224,127 B1 * | 5/2001 | Hodge ...................... | B60P 3/14 |
| | | | 182/150 |
| 8,573,673 B1 | 11/2013 | Puglisi, Sr. | |
| 9,139,138 B2 | 9/2015 | Fisher | |
| 9,862,431 B1 * | 1/2018 | Hemphill ............... | B62D 33/03 |
| 2001/0042985 A1 * | 11/2001 | Hodge ...................... | B60P 3/14 |
| | | | 296/26.08 |
| 2003/0085584 A1 | 5/2003 | Golden | |
| 2018/0015963 A1 * | 1/2018 | Loew ................. | B62D 33/0273 |
| 2018/0043831 A1 * | 2/2018 | Stojkovic ........... | B62D 33/0273 |

* cited by examiner

*Primary Examiner* — Lori L Lyjak
(74) *Attorney, Agent, or Firm* — Jason Rogers; Bejin Bieneman PLC

(57) ABSTRACT

A tailgate assembly of a vehicle includes a tailgate, a left workpiece holder, and a right workpiece holder. The tailgate is elongated along an axis from a vehicle-left end to a vehicle-right end. The tailgate includes a left pocket at the vehicle-left end and a right pocket at the vehicle-right end. The left workpiece holder has an L shape and is configured to slidably engage the left pocket along the axis, and the right workpiece holder has an L shape and is configured to slidably engage the right pocket along the axis.

20 Claims, 4 Drawing Sheets

TAILGATE ASSEMBLY

BACKGROUND

A pickup truck includes a front end having an engine and a cab and a rear end having a bed. The bed is a platform onto which cargo may be loaded. The bed is bordered by a back wall of the cab, two side walls, and a tailgate. The tailgate is movable from an open position in which the tailgate is coplanar with the bed, i.e., generally horizontal, to a closed position in which the tailgate is perpendicular to the bed, i.e., generally vertical. The closed position keeps cargo from sliding off the bed while the truck is in motion, and the open position allows easier access to the bed for loading and unloading cargo.

DETAILED DESCRIPTION

Figure 1:
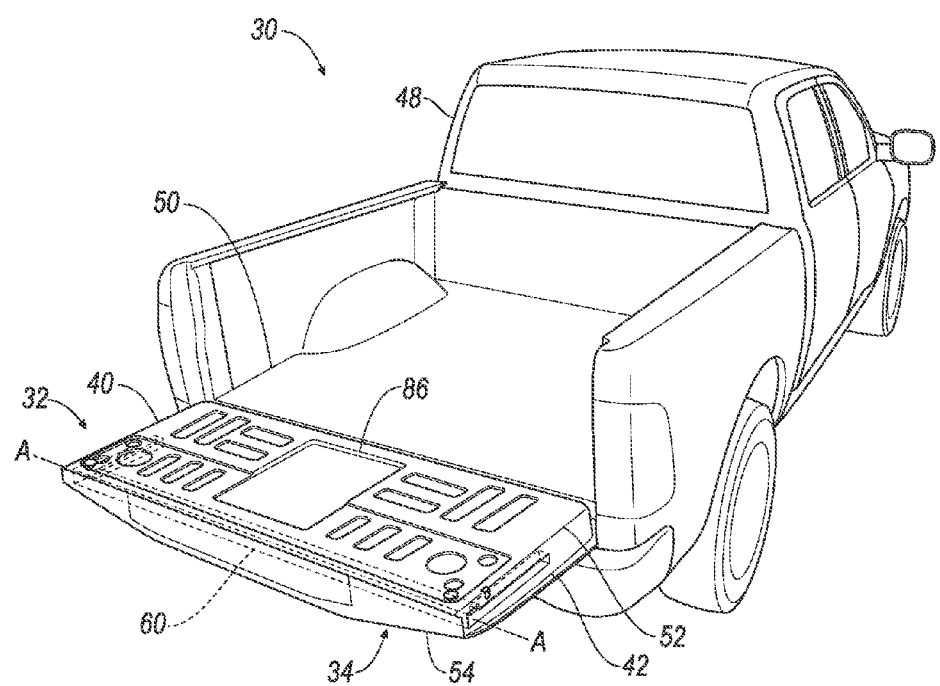
FIG. 1 is a perspective view of a pickup truck.

With reference to the Figures, wherein like numerals indicate like parts throughout the several views, a tailgate assembly 32 of a vehicle 30 includes a tailgate 34, a left workpiece holder 36, and a right workpiece holder 38. The tailgate 34 has a vehicle-left end 40 and a vehicle-right end 42, and the tailgate 34 is elongated along an axis A from the vehicle-left end 40 to the vehicle-right end 42. The tailgate 34 includes a left pocket 44 at the vehicle-left end 40 and a right pocket 46 at the vehicle-right end 42. The left workpiece holder 36 has an L shape and is configured to slidably engage the left pocket 44 along the axis A, and the right workpiece holder 38 has an L shape and is configured to slidably engage the right pocket 46 along the axis A.

The tailgate assembly 32 provides a convenient way to saw lumber in an arbitrary environment that may lack tables, for example, a worksite. The tailgate 34 gains additional functionality as a worktable, eliminating a need to transport a worktable. The pockets 44, 46 conform well with packaging constraints of existing designs of tailgates 34 for pickup trucks and facilitate the convertible functionality of the tailgate 34.

With reference to FIG. 1, the vehicle 30 may be a pickup truck. The vehicle 30 may include a cab 48 and a bed 50.

Figure 2:
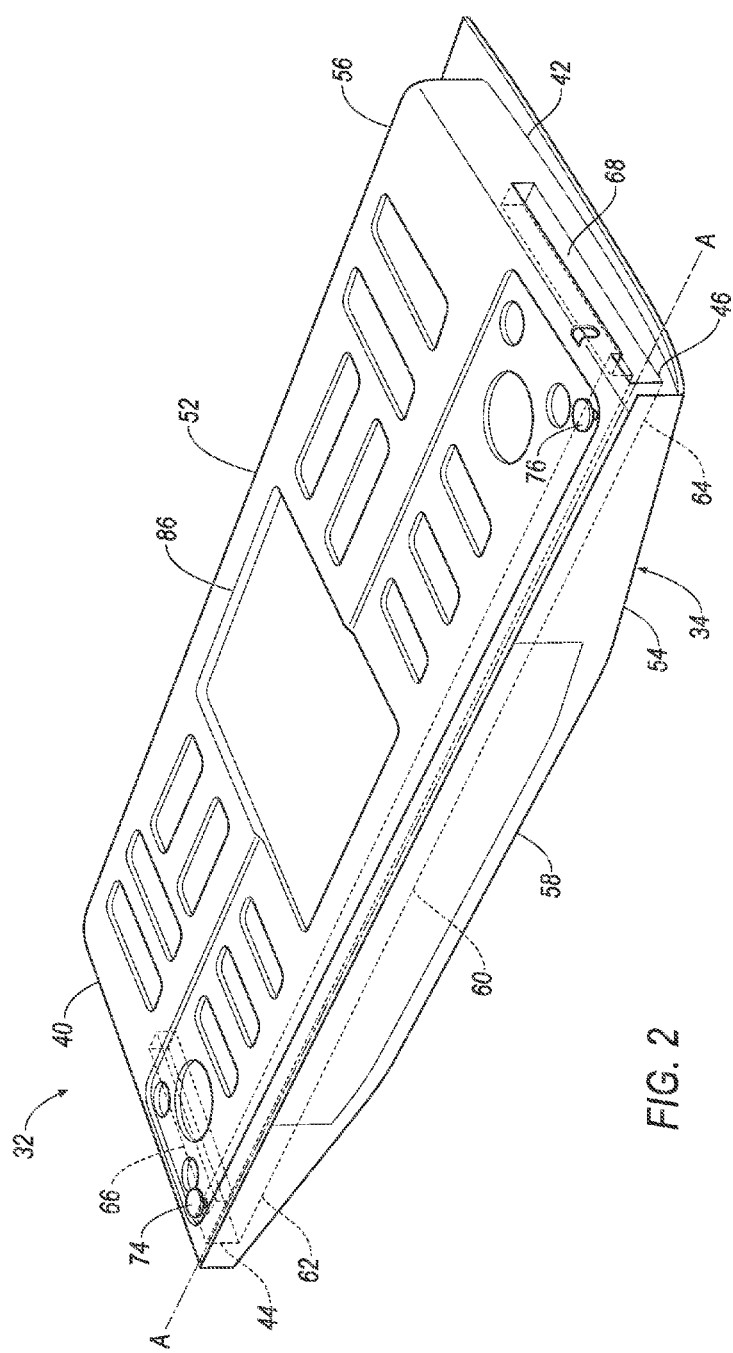
FIG. 2 is a perspective view of a tailgate of the pickup truck.

With reference to FIG. 2, the tailgate 34 is elongated along the axis A from the vehicle-left end 40 to the vehicle-right end 42. The tailgate 34 may include inboard and outboard panels 52, 54 extending from the vehicle-left end 40 to the vehicle-right end 42. The inboard panel 52 and the outboard panel 54 may be formed of the same type of material or different types of material, for example, of metal (e.g., aluminum, steel, etc.), plastic, fiber-reinforced composites, etc. The inboard panel 52 and the outboard panel 54 may be spaced from each other and define a cavity therebetween.

The tailgate 34 may include hinged and free ends 56, 58 extending between the vehicle-left and vehicle-right ends 40, 42. The hinged end 56 may be hingedly attached to the bed 50 of the vehicle 30. The tailgate 34 may be movable from an open position in which the inboard panel 52 is coplanar with the bed 50 (as shown in FIG. 1) to a closed position in which the inboard panel 52 is perpendicular to the bed 50 (not shown).

With reference to FIG. 2, the tailgate 34 includes the left pocket 44 at the vehicle-left end 40 and the right pocket 46 at the vehicle-right end 42. The pockets 44, 46 extend into the tailgate 34 along the axis A, i.e., in a direction parallel to the axis A and on or spaced from the axis A. The pockets 44, 46 are sized to slidably receive the workpiece holders 36, 38. A cross-section of the pockets 44, 46 may correspond to a cross-section of the workpiece holders 36, 38, i.e., match in size and shape.

The tailgate 34 may include a tube 60 extending from the vehicle-left end 40 to the vehicle-right end 42. The tube 60 may have the pockets 44, 46. Specifically, the left pocket 44 may be disposed at a left end 62 of the tube 60, and the right pocket 46 may be disposed at a right end 64 of the tube 60.

The tube 60 may have a cross-section that is uniform from the left end 62 to the right end 64. The cross-section of the pockets 44, 46 may be the same as a cross-section of an inside of the tube 60. The tube 60 may extend between the inboard and outboard panels 52, 54 and parallel to and adjacent the free end 58 of the tailgate 34. "Adjacent" means the lack of anything therebetween. The tube 60 may be an extrusion formed of metal, e.g., steel, aluminum, etc.

With continued reference to FIG. 2, the tailgate 34 may include a left channel 66 at the vehicle-left end 40 and a right channel 68 at the vehicle-right end 42. The left channel 66 may extend along the vehicle-left end 40, and the right channel 68 may extend along the vehicle-right end 42. The left channel 66 and the right channel 68 may be elongated in a direction transverse to the axis A, e.g., perpendicular to the axis A. Each channel 66, 68 may be sized to receive a second beam 72 of one of the workpiece holders 36, 38. (The adjectives "first" and "second" are used throughout this document as identifiers and are not intended to signify importance or order.)

The tailgate 34 may include a left knob 74 and a right knob 76. The left knob 74 and the right knob 76 may be supported by the inboard panel 52 and may extend through the inboard panel 52 into the left and right pockets 44, 46, respectively. Specifically, the left knob 74 and the right knob 76 may be threadedly engaged with the inboard panel 52. The left knob 74 may be adjustable, e.g., relative to the inboard panel 52 and the first beam 70 of the left workpiece holder 36, between a locked position preventing movement of a first beam 70 of the left workpiece holder 36 relative to the left pocket 44 and an unlocked position allowing movement of the first beam 70 of the left workpiece holder 36 relative to the left pocket 44. The left knob 74 may be an adjustable screw twistable between the locked position engaging the first beam 70 and the unlocked position spaced from the first beam 70. Likewise, the right knob 76 may be adjustable, e.g., relative to the inboard panel 52 and the first beam 70 of the right workpiece holder 38, between a locked position preventing movement of the first beam 70 of the right workpiece holder 38 relative to the right pocket 46 and an unlocked position allowing movement of the first beam 70 of the right workpiece holder 38 relative to the right pocket 46.

Figure 3:
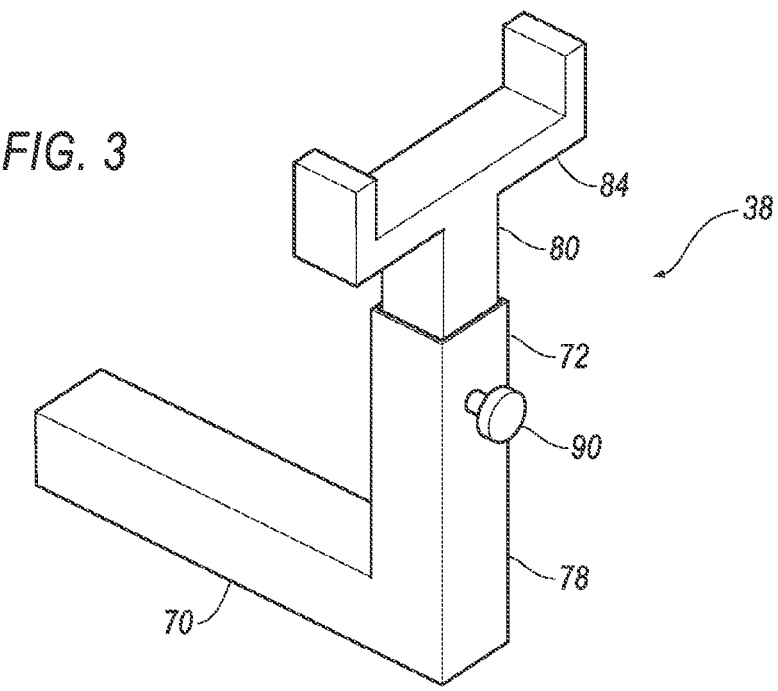
FIG. 3 is a perspective view of a first embodiment of a workpiece holder.
Figure 4:
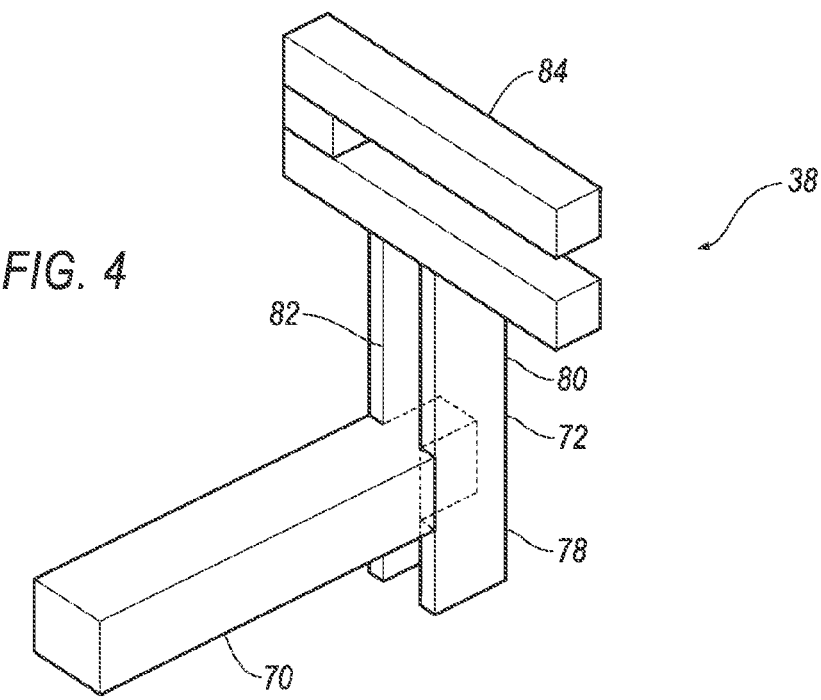
FIG. 4 is a perspective view of a second embodiment of a workpiece holder.

With reference to FIGS. 3 and 4, the left workpiece holder 36 has an L shape and is configured to slidably engage the left pocket 44 along the axis A. The right workpiece holder 38 has an L shape and is configured to slidably engage the right pocket 46 along the axis A. The workpiece holders 36, 38 may include the first beam 70 and the second beam 72 arranged in the L shape.

The first beam 70 may be configured to slidably engage one of the pockets 44, 46 along the axis A. The first beam 70 may be slidably adjustable within one of the pockets 44, 46. For example, a cross-section of the first beam 70 may correspond to the cross-section of the pockets 44, 46, allowing the first beam 70 to slide into and out of one of the pockets 44, 46.

The second beam 72 may be transverse, e.g., perpendicular, to the first beam 70. For example, with reference to FIG. 3, the second beam 72 may extend from a first end portion 78 to a second end portion 80. The first end portion 78 may be attached to the first beam 70, and the second end portion 80 may be telescopically extendable relative to the first end portion 78. The second beam 72 may include a knob 90 adjustable between a locked position preventing movement of the second end portion 80 relative to the first end portion 78 and an unlocked position allowing movement of the second end portion 80 relative to the first end portion 78. The knob 90 may be supported by the first end portion 78 and may extend through the first end portion 78 to the second end portion 80. Specifically, the knob 90 may be threadedly engaged with the first end portion 78. In this configuration, the knob 90 may be threadedly advanced toward the second end portion 80 into contact with the second end portion 80 in the locked position, and threadedly retracted away from the second end portion 80 out of contact with the second end portion 80 in the unlocked position.

Alternatively, with reference to FIG. 4, the second beam 72 may include a track 82, and an end of the first beam 70 may engage the track 82. The second beam 72 may slide along the track 82 in a direction perpendicular to the first beam 70. In this configuration, one or more threaded fasteners (not shown) may fix the first beam 70 and the second beam 72 relative to each other along the track 82.

Each workpiece holder 36, 38 may include a pad 84 attached to the second end 80 of the second beam 72. The pad 84 may be designed to hold lumber. For example, the pad 84 may be U-shaped, as shown in FIG. 3, or include a clamp, as shown in FIG. 4. The pad 84 may include any suitable feature for gripping a workpiece, e.g., lumber, such as a vice, clamping jaws, etc.

Figure 5:
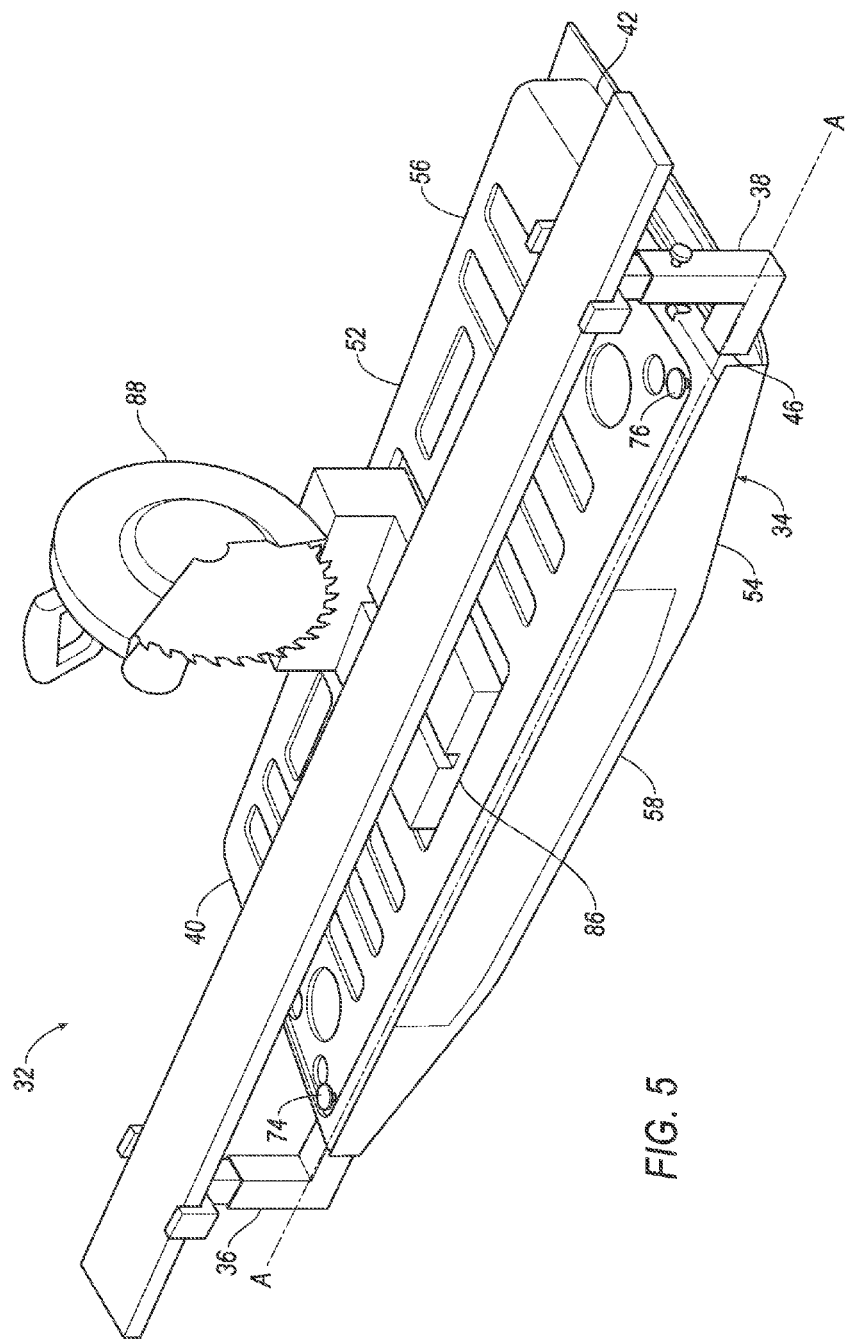
FIG. 5 is a perspective view of the workpiece holder engaged with the tailgate.

With reference to FIG. 5, the inboard panel 52 may include a mounting platform 86 designed to fixedly support a platform of a saw 88, for example, a chop saw. The mounting platform 86 may be on the axis A. The mounting platform 86 secures the saw 88 to the tailgate 34 to prevent the saw 88 from moving or sliding relative to the tailgate 34. The mounting platform 86 may be recessed and/or may include threaded fasteners, clamping arms, etc., for fixing the saw 88 to the mounting platform.

When not in use, the workpiece holders 36, 38 may be stored in the bed 50 of the vehicle 30. Alternatively, the workpiece holders 36, 38 may be stored in the pockets 44, 46. Specifically, the first beams 70 of the workpiece holders 36, 38 may be slid entirely into the pockets 44, 46, and the second beams 72 may be oriented along the vehicle-left and vehicle-right ends 40, 42 and may be received by the channels 66, 68 so that the workpiece holders 36, 38 are flush with the vehicle-left and vehicle-right ends 40, 42 of the tailgate 34. Thus, the tailgate 34 may move from the open position to the closed position while the workpiece holders 36, 38 are stored in the pockets 44, 46.

When in use, the workpiece holders 36, 38 may be slid into the tailgate 34 in the open position. The first beams 70 may be slid into the pockets 44, 46, and the second beams 72 may be oriented perpendicular to the vehicle-left and vehicle-right ends 40, 42. The saw 88 may be placed on and fixed to the mounting platform 86. The second beams 72 may be adjusted relative to the first beams 70 to hold lumber at a height within a cutting region of the saw 88. The saw 88 may be then used to cut lumber stably held in place.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A tailgate assembly comprising:
   a tailgate elongated along an axis from a vehicle-left end to a vehicle-right end and including a left pocket at the vehicle-left end and a right pocket at the vehicle-right end;
   a left workpiece holder having an L shape and configured to slidably engage the left pocket along the axis; and
   a right workpiece holder having an L shape and configured to slidably engage the right pocket along the axis.

2. The tailgate assembly of claim 1, wherein the tailgate includes a tube extending from the vehicle-left end to the vehicle-right end of the tailgate and having the pockets.

3. The tailgate assembly of claim 2, wherein the left pocket is disposed at a left end of the tube, and the right pocket is disposed at a right end of the tube spaced from the left end.

4. The tailgate assembly of claim 3, wherein the tube has a cross-section that is uniform from a left end to a right end of the tube.

5. The tailgate assembly of claim 2, wherein the tailgate includes inboard and outboard panels extending from the vehicle-left end to the vehicle-right end, and the tube is disposed between the inboard and outboard panels.

6. The tailgate assembly of claim 2, wherein the tailgate includes hinged and free ends extending between the vehicle-left and vehicle-right ends, and the tube extends parallel to and adjacent the free end.

7. The tailgate assembly of claim 1, wherein each workpiece holder includes a first beam configured to slidably engage one of the pockets along the axis and a second beam transverse to the first beam.

8. The tailgate assembly of claim 7, wherein the tailgate includes a left channel at the vehicle-left end of the tailgate and a right channel at the vehicle-right end of the tailgate, each channel sized to receive one of the second beams.

9. The tailgate assembly of claim 7, wherein the second beam extends from a first end portion to a second end portion, the first end portion attached to the first beam, the second end portion telescopically extendable relative to the first end portion.

10. The tailgate assembly of claim 9, wherein the second beam includes a knob adjustable between a locked position preventing movement of the second end portion relative to the first end portion and an unlocked position allowing movement of the second end portion relative to the first end portion.

11. The tailgate assembly of claim 7, wherein the second beam includes a track, and an end of the first beam engages the track.

12. The tailgate assembly of claim 11, wherein the second beam is adjustable relative to the first beam along the track.

13. The tailgate assembly of claim 7, wherein each workpiece holder includes a pad attached to an end of the second beam.

14. The tailgate assembly of claim 13, wherein the pad is U-shaped.

15. The tailgate assembly of claim 13, wherein the pad includes a clamp.

16. The tailgate assembly of claim 13, wherein the pad is designed to hold lumber.

17. The tailgate assembly of claim 7, wherein the first beam is slidably adjustable within the pocket.

18. The tailgate assembly of claim 17, wherein the tailgate includes a left knob adjustable between a locked position preventing movement of the first beam of the left workpiece holder relative to the pocket and an unlocked position allowing movement of the first beam of the left workpiece holder relative to the left pocket, and a right knob adjustable between a locked position preventing movement of the first beam of the right workpiece holder relative to the pocket and an unlocked position allowing movement of the first beam of the right workpiece holder relative to the right pocket.

19. The tailgate assembly of claim 1, wherein the tailgate includes inboard and outboard panels extending from the vehicle-left end to the vehicle-right end, and the inboard panel includes a mounting platform designed to fixedly support a platform of a saw.

20. The tailgate assembly of claim 19, wherein the mounting platform is on the axis.

\* \* \* \* \*